United States Patent
Lubawy et al.

(10) Patent No.: US 6,353,479 B1
(45) Date of Patent: Mar. 5, 2002

(54) MEDIA-TYPE ENCODING AND PRINT MODE SELECTION

(75) Inventors: Carmalyn Lubawy; David Hall, both of Vancouver, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/342,678

(22) Filed: Jun. 29, 1999

(51) Int. Cl.[7] ............................................. G06F 15/00
(52) U.S. Cl. ...................... 358/1.13; 358/1.15
(58) Field of Search .................. 358/1.1, 1.2, 1.4, 358/1.6, 1.9, 1.12, 1.13, 1.14, 1.15, 1.18, 449, 453, 467, 488; 382/140, 151, 170, 190; 347/101, 106, 177, 188, 191, 221; 707/104, 500, 504, 524

(56) References Cited

U.S. PATENT DOCUMENTS

| | | | | |
|---|---|---|---|---|
| 5,159,340 A | | 10/1992 | Smith | 341/132 |
| 5,206,490 A | | 4/1993 | Petigrew | 347/100 |
| 5,235,655 A | * | 8/1993 | Hikawa | 382/317 |
| 5,600,353 A | | 2/1997 | Hickman | 347/43 |
| 5,629,512 A | | 5/1997 | Haga | 235/468 |
| 5,633,670 A | * | 5/1997 | Kwak | 347/188 |
| 5,639,169 A | * | 6/1997 | Aruga | 400/605 |
| 5,671,067 A | * | 9/1997 | Negishi et al. | 358/403 |
| 5,723,202 A | | 3/1998 | Mueller | 428/194 |
| 5,754,213 A | * | 5/1998 | Whritenor | 347/218 |
| 5,801,722 A | | 9/1998 | Ueda | 347/16 |
| 5,816,165 A | | 10/1998 | Huston | 101/490 |
| 5,861,618 A | | 1/1999 | Berson | 235/468 |
| 5,880,176 A | | 3/1999 | Kamoto | 523/172 |
| 6,012,068 A | * | 1/2000 | Boezeman et al. | 707/104 |
| 6,039,426 A | * | 3/2000 | Dobbs | 347/19 |
| 6,047,110 A | * | 4/2000 | Smith | 358/1.12 |
| 6,079,807 A | * | 6/2000 | Lindstrom et al. | 523/172 |

* cited by examiner

*Primary Examiner*—Gabriel I. Garcia

(57) ABSTRACT

A technique for efficiently using media-type identifier code on print media and for processing that code, once read, to select the appropriate print mode for a printer that is to print onto that media. The system of the present invention minimizes the number of bits of data that must be associated with (hence, marked on) a sheet of print media to convey adequately the information as to the type of media, and is inherently backwards compatible. The invention uses simplified encoding and algorithm processing, which, in a preferred embodiment, includes a look-up table for storing known media-type code with associated print modes. A distance algorithm is used for locating the most appropriate print mode for given media-type identifier code that is not found in the table.

18 Claims, 3 Drawing Sheets

| 000011001101 | N1 |
| 000011000011 | T1 |
| 000010000010 | T4 |

MEDIA-TYPE ENCODING AND PRINT MODE SELECTION

TECHNICAL FIELD

This invention relates to techniques for encoding on print media information relating to the physical characteristics (type) of media, and for automatically selecting a print mode of a printer based upon detection of that information.

BACKGROUND AND SUMMARY OF THE INVENTION

Ink-jet printers are popular and cost-effective devices for producing black-and-white and color images. An ink-jet printer may include one or more ink-filled cartridges. The cartridges are mounted to a carriage in the printer body. Normally, the carriage is scanned across the width of the printer as paper or other print media is advanced through the printer. Each ink-filled cartridge includes at least one print head that is driven by signals from the printer's processor to expel droplets of ink through an array of nozzles. The timing of the droplets are controlled to generate the desired text or image output on the print media.

In addition to traditional cut-paper stock, there are several other types of print media that are used with modern printers. For instance, one media type, known as a "transparency," is typically formed of a polyethylene terephtalate (PET) film and is used for overhead projectors and the like. Such media, as compared to typical paper stock, is glossy and has different ink absorbance. As a result, printing an image on a transparency type of media is best done using a print mode that includes multiple passes of the carriage so that part of the image is printed with each pass, thereby enhancing the drying of the ink on this media. This multiple pass approach is an example of a printer's mode of operation (print mode), which is selected as a function of the type of print media that is presented to the printer.

The quality of color printing by ink-jet type printers has advanced to a level such that photo-quality images can be produced. To this end, special print media, hereafter collectively referred to as "photo media," has been developed for best emulating the glossiness, depth of color, etc of a conventional photograph. Printing a color image on photo media may call for different color mapping than might be used to print the same color image on another type of print medium. For example, a green element of the image may be printed with three yellow-ink droplets and two cyan-ink droplets on one media type. That same green element may require two yellow-ink droplets and three cyan-ink droplets if the same image were printed on photo media. Such color mapping, which is controlled by the printer's processor, is another example of a print mode that is dependent upon the type of print media provided to the printer.

There are many different types of transparencies, although most of these types may be printed using the same print mode. The same is true for photo media printing. A good share of the different types of photo media may be printed with the same print mode. Certain types of media, however, have specific print mode requirements (a particularly unique color map, for instance) that may not be met with more common print modes that are used for printing groups of media types.

One way of ascertaining the type of print media that is provided to the printer (and thereafter selecting the appropriate print mode) is to encode the media with machine-readable information that is indicative of the media type. The information may be provided by coding that is applied to each sheet of the media with ink or other marking fluid that is invisible to the naked eye.

For instance, the margins of the sheet may be printed with a fluorescent bar code that is excited by ultraviolet radiation to emit visible light. Alternatively, an infrared fluorescent marking, which is excited by infrared radiation to emit such radiation, could be applied to the sheet as its identifying bar code. There are may other ways of invisibly encoding the media.

A printer may be equipped with a reader that is capable of detecting invisible code. The reader is positioned to detect the code of the print media that is about to enter the printer. The media-type information carried in the code is then used in selecting the print mode to be employed by the printer for such media.

In an automatic print mode selection system just outlined, which reads the media-type identification information encoded on the print media, it is desirable to ensure that existing printers can select a proper print mode for new media. Moreover, the print mode selection system should minimize the amount of information-storage space required for carrying out the print mode selection. In particular, the system should minimize the number of bits needed for media-type encoding, while providing error correction.

The present invention provides a technique for efficiently encoding the media-type information (hereafter referred to as identifier code) on print media, and for processing that information, once read, to select the appropriate print mode to be employed.

The system of the present invention minimizes storage space in the printer by using a small look-up table and a simple algorithm for selecting the correct print mode for any type of print media provided to the printer.

The system thus eliminates the relatively large storage space requirements that would otherwise be needed if all known media types were tabulated, and such tabulation were used in the printer as a large look-up table for matching media identifier code with a particular media type in the table. In a preferred embodiment, a two-dimensional matrix is constructed for storing known identifier codes with associated print modes. One dimension of the matrix (which can also be considered a column address of a table) is incremented in units that correspond to half of the identifier code of the media. Similarly, the other dimension of the matrix (row addresses of a table) is incremented in units that correspond to the other half of the identifier code of the media. Thus, in its simplest implementation the identifier code on a sheet of media is the concatenation of two matrix dimensions, which point to a single location in the matrix (or cell in the table).

Similar types of media are grouped together in the matrix. For instance, all known transparencies may be grouped in the upper left portion of the matrix and all known photo media are grouped in the lower right portion of the matrix. These clusters of media are thus related by ranges of identifier code.

A very small subset of the just-described matrix is stored in the printer memory. This subset contains only the identifier codes of particular print media that require print modes that are different from other media of the same type. This table may include, for example, three or four entries, as compared to the matrix, which may have over four-thousand entries.

In a preferred embodiment, the identifier code is comprised of twelve binary data bits. Each location in the matrix is addressed by two, six-bit units. Moreover, the encoding is established using cyclic binary code (Gray Code) thereby to enhance error rejection and eliminate the need for additional error correction bits.

The printer reads the media-type identifier code carried on a sheet. The small look-up table is then consulted. If a match is found, the printer controls the carriage and/or print heads in accordance with the associated print mode.

If a match in the look-up table is not found, the system of the present invention utilizes a simple algorithm for determining media-type information (and associated print mode) in a manner that facilitates a rapid determination of the print mode that is best suited for the media entering the printer. It will be appreciated that this aspect of the invention ensures that the system will carry with it the advantage of backward compatibility by assigning the correct print mode to print media that may developed in the future and at that time assigned its own unique, previously unknown identifier code.

Other advantages and features of the present invention will become clear upon study of the following portion of this specification and the drawings.

DETAILED DESCRIPTION OF PREFERRED EMBODIMENTS

Figures 1, 2:
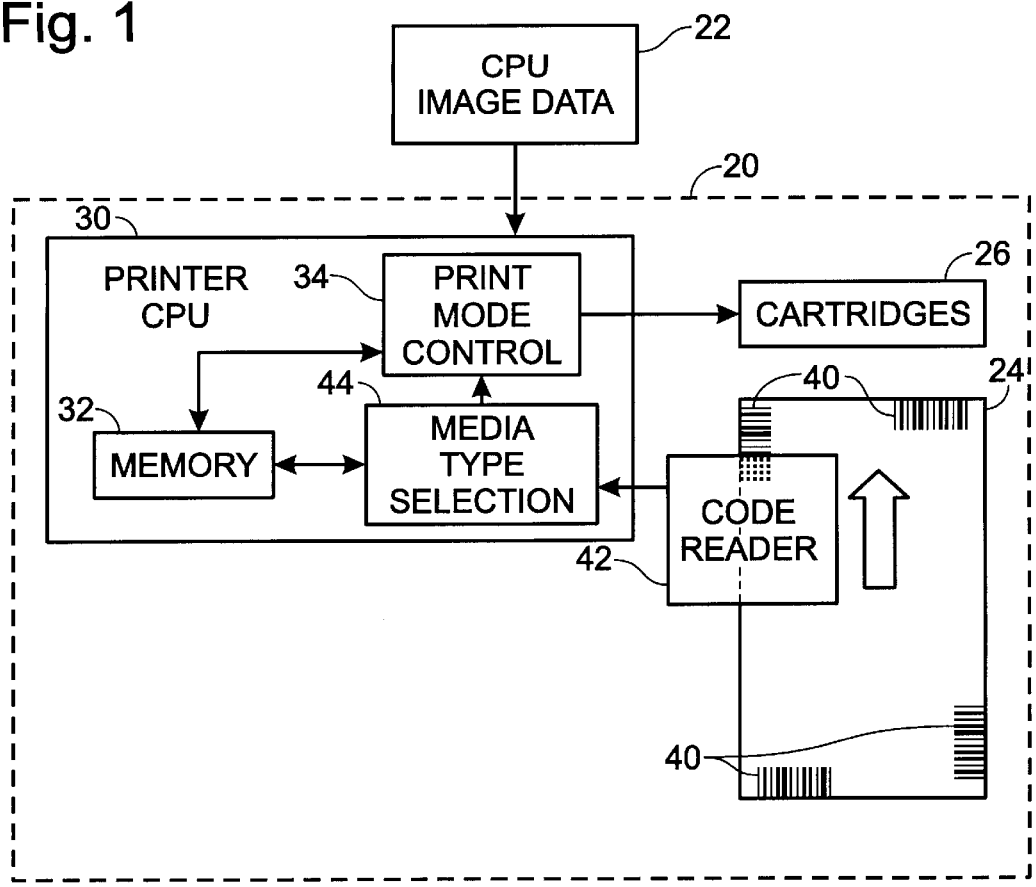
FIG. 1 is a block diagram of a system employing the media-type encoding and print mode selection technique of the present invention.
FIG. 2 is a diagram of a preferred look-up table useful with the system and method of the present invention.

As diagrammed in FIG. 1, the system of the present invention depicts a printer 20, such as an ink-jet type and several, but not all, of its primary components. The printer is connected with an external device, such as a personal computer, having a central processing unit (CPU) 22. That CPU 22 provides a stream of image data for processing by the printer 20 to render that image onto a sheet of print media 24 that is advanced through the printer.

The image is rendered by the activation of print heads that are carried on the print cartridges 26. As noted above, one or more ink-filled cartridges are mounted to a carriage in the printer body. Normally, the carriage is scanned across the width of the printer as paper or other print media is advanced through the printer. The print heads are driven to expel droplets of ink toward the print media 24 to form the image.

The following describes only three different print modes, thereby to simplify this description. As will become clear, however, the principles of the present invention are certainly applicable to printers having a large number of different print modes.

In instances where the print media 24 is typical, cut-paper stock, the printer controls the cartridges (hence the print heads) to operate under a print mode that may be designated as "normal." Such a print mode may, for example, have associated with it a particular color map to best render colors for that type of print media. For instance, a green element of the image may require three droplets of yellow-colored ink and two droplets of cyan-colored ink. This particular color map may be stored in the printer's non-volatile memory, in the form of read-only memory (ROM) 32. The printer CPU 30 is programmed to include a print mode control module 34 for accessing the ROM 32 to obtain the appropriate color map (that is, the color map pre-selected and designated for use with the particular type of media 24) and drive the cartridges accordingly.

In instances where the print media 24 is photo media, the printer controls the cartridges to operate under a print mode that may be designated as "photo." Such a print mode may, for example, have associated with it a particular color map to best render colors for that photo media. For instance, a green element of the image may require two droplets of yellow-colored ink and three droplets of cyan-colored ink. This particular color map is stored in the printer's ROM 32. The print mode control module 34 obtains the "photo" color map and drives the cartridges accordingly.

In instances where the print media 24 is of the transparency type, the printer controls the cartridge print heads to operate under a print mode that may be designated as "transparency." Such a print mode may, for example, require the printer carriage (to which the cartridges are mounted) to make several passes or scans before the media is incrementally advanced, so that part of the image for that scan width is printed with each pass. This enhances drying of the ink on the transparency type media. The print mode control module 34 thus drives the carriage accordingly.

In accordance with a preferred embodiment of the present invention, information relating to the type of print media 24 is encoded onto each sheet of the media 24 as a machine-readable bar code 40. The bar code 40 may be of conventional design whereby alternating portions of reflective and non-reflective strips are sized (thick or thin) typically to represent a string of "1"s and "0"s, a binary code. The binary code could alternatively be derived from merely detecting the presence or absence of bars along the length of the code.

In a preferred embodiment, the bar code data contains twelve bits of information related to the type of media that carries the code, as described more fully below. Any type of bar code will suffice, but in the preferred embodiment, it is required that the bar code information be applied to media with ink or other marking fluid that is invisible to the naked eye (the code 40 appearing in the drawing for illustrative purposes).

In particular, the bar code 40, which preferably appears on all four margins of the sheet, may be marked with fluorescent material that is excited by, for example, ultraviolet radiation to emit visible light. Alternatively, an infrared fluorescent marking, which is excited by infrared radiation to emit such radiation, could be applied as the otherwise invisible bar code 40. Another suitable bar code material is that sold under the trademark "ClirCode" by Eastman Chemical Company of Kingsport, Tennessee. This material is excited by near-infrared light.

A code reader 42 is mounted in the printer 20 in the vicinity of the media feed tray (not shown) thereby to read the bar code of a sheet of media 24 that is about to be advanced into the printer and to the cartridges 26 for receiving ink during the printing operation. The code reader 42 includes a source of radiation (such as ultraviolet, infrared, laser, etc.) for exciting the fluorescent bar code 40 as it is moved with the advancing paper.

A radiation detector is arranged in the code reader 42 to receive the radiation emitted by the radiation-excited bar code 40. The detector produces as output an analog electrical signal that is a continues, time-varying signal having an amplitude that varies with the amount of radiation received, which in turn relates to the particular configuration of the bar code 40. The time-varying analog signal received on the reader 42 is sampled (for example, at 23 samples/bit) and the result of the sampling is converted by an analog-to-digital circuit into a string of digital information ("1"s and "0"s) representing the identifier code.

It will be appreciated that any of a variety of conventional approaches can be employed to carry out the function of the card reader 42 as just described. For instance, in the event that the bar code 40 is applied using the above mentioned Eastman Chemical "ClirCode" marking system, the code reader may be embodied substantially as the bar code scanner sold as Model 24IR by Accu-Sort Systems, Inc., of Telford, Pa.

Other methods for applying the identifier code to the paper media may include minute holes in the sheet (or notches in the sheet edge) for detection by a light-transmissive sensor. Such markings are limited to within a small margin of the sheet, such as within 0.2 mm from the edge of the sheet.

The identifier code is output by the code reader 42 and provided as buffered input to the printer CPU 30 for processing via a media type selection module 44 of the program running on the CPU 30.

As mentioned above, the present invention includes an identifier code that assigns twelve bits (that is, the string of twelve "1"s and "0"s provided to the CPU 30) for identifying the type of media (photo media, transparency, normal, etc) that carries the identifier code.

It is noteworthy that the code applied to the media may contain more that the twelve bits of information, although the focus here is on the twelve bits that comprise the identifier code.

The twelve-bit identifier code is referenced by the media type selection module 44 to a look-up table that is constructed in accordance with the present invention and previously stored in memory 32. The particulars of the look-up table are described next with reference to FIG. 2.

The diagram of FIG. 2 represents a look-up table 50 that is stored in the ROM 32 of the printer 20. This table comprises the identifier codes of particular print media that require print modes that are different from other media of the same type. Inasmuch as most media of the same type (such as transparencies, for example) may be printed with a common print mode, this look-up table 50 will comprise only a small fraction of known media types. For instance, the table 50 may include three or four entries, as compared to a four-thousand-entry matrix containing all known media types. The use of this small look-up table, therefore, dramatically reduces the necessary space in ROM for storing it.

The table 50 is organized so that if a match is found between the identifier code (such as 000011000011) carried by the media sheet and a code in the first column of the table, the printer selects the particular print mode (T1) associated with that media sheet and stored in the second column.

Thus, as a first step in selecting the correct print mode for a sheet 24 of media for which a twelve-bit identifier is provided to media type selection module 44 is to determine whether that identifier code matches any of the known papers in table 50. If a match is found, the print mode associated with that cell is conveyed to the print mode control module 34 for controlling the printing of the cartridges, as described above.

As noted above, one of the advantages of the present invention is that the appropriate print mode will be assigned to particular types of print media even if the media is not tabulated in the just described look-up table. This may occur, for instance, when the same print mode may be used for many different print media of the same type and when new types of media are introduced after the look-up table 50 is constructed. Accordingly, the system provides for backward compatibility, as will be explained.

Figure 3:
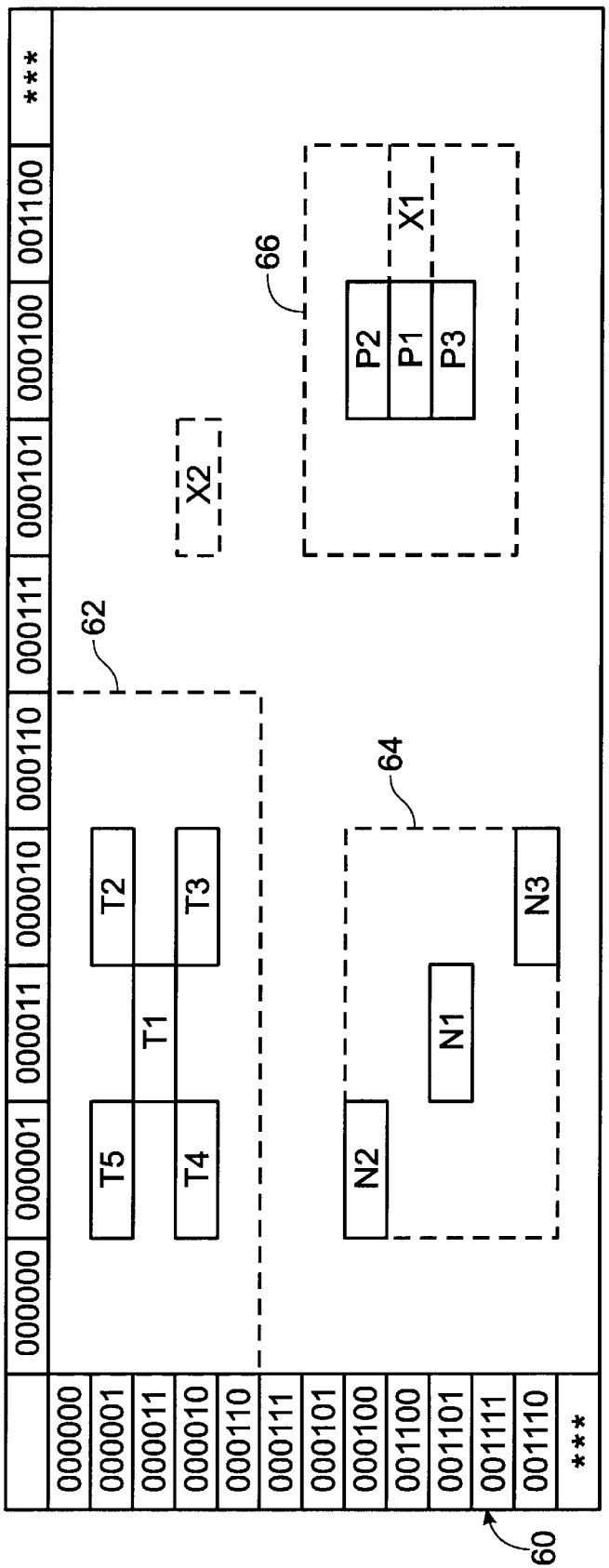
FIG. 3 is a diagram of another matrix or look-up table useful with the system and method of the present invention.

The media type selection module 44 employs a simple distance algorithm in instances where the media identifier code does not match one of those in table 50 (FIG. 2). The algorithm is best understood by considering a portion of the above-mentioned matrix, which is shown in table form 60 in FIG. 3.

In constructing the matrix or table 60, regions are reserved for print media of certain types. These regions or clusters are defined by a selected range of column and row addresses. These are selected so that groups of media-types are separately clustered, away from (in the address sense) other types of media. For example, dashed line 62 represents a range of table addresses designated as a transparency cluster. Cluster 64 groups different manufacturer's normal media. Cluster 66 groups photo media. A particular print mode is associated in memory with each cluster.

The preferred approach for providing the identifier code (hence, the preferred technique for establishing column and row addresses) is to use cyclic binary code (also known as Gray code), as appears in table 60. This preferred representation is such that each six-bit column address or row address differs from the one that precedes it by one bit, in one position. It will be appreciated by one of ordinary skill, that the use of cyclic binary code in this fashion enhances the reliability of the system because the data provided by the code reader is less likely to have single-bit errors.

In the event that a previously unknown paper X2 is detected to have an identifier 000101000010 (such an unknown identifier may be attributable to a one- or two-bit error in the data provided to the module 44), the media type selection module 44 selects the cluster that is nearest to that identifier/cell address.

To this end, the stored address of each cell T1, N1, P1 that corresponds to the center of an associated media-type cluster is employed. With this center-cell information, as well as the address of the unknown media type X2, the media type selection module 44 calls a routine that performs a simple algebraic distance algorithm to determine the distance between the cell X2 and the center of each cluster. In this regard, it is noted that the column and row addresses of the table provide a predictable ascending or descending sequence for use with such an algorithm (the decimal equivalents of the column addresses are 0, 1, 2, 3, 4, etc). The use of this algorithm requires significantly less storage space than would be required for storing in ROM the entire matrix 60.

The unknown media type X2 is then assigned the print mode associated with the central cell to which the unknown media address/identifier is nearest. This mode will be the most suitable one for the X2 media.

Figure 4:
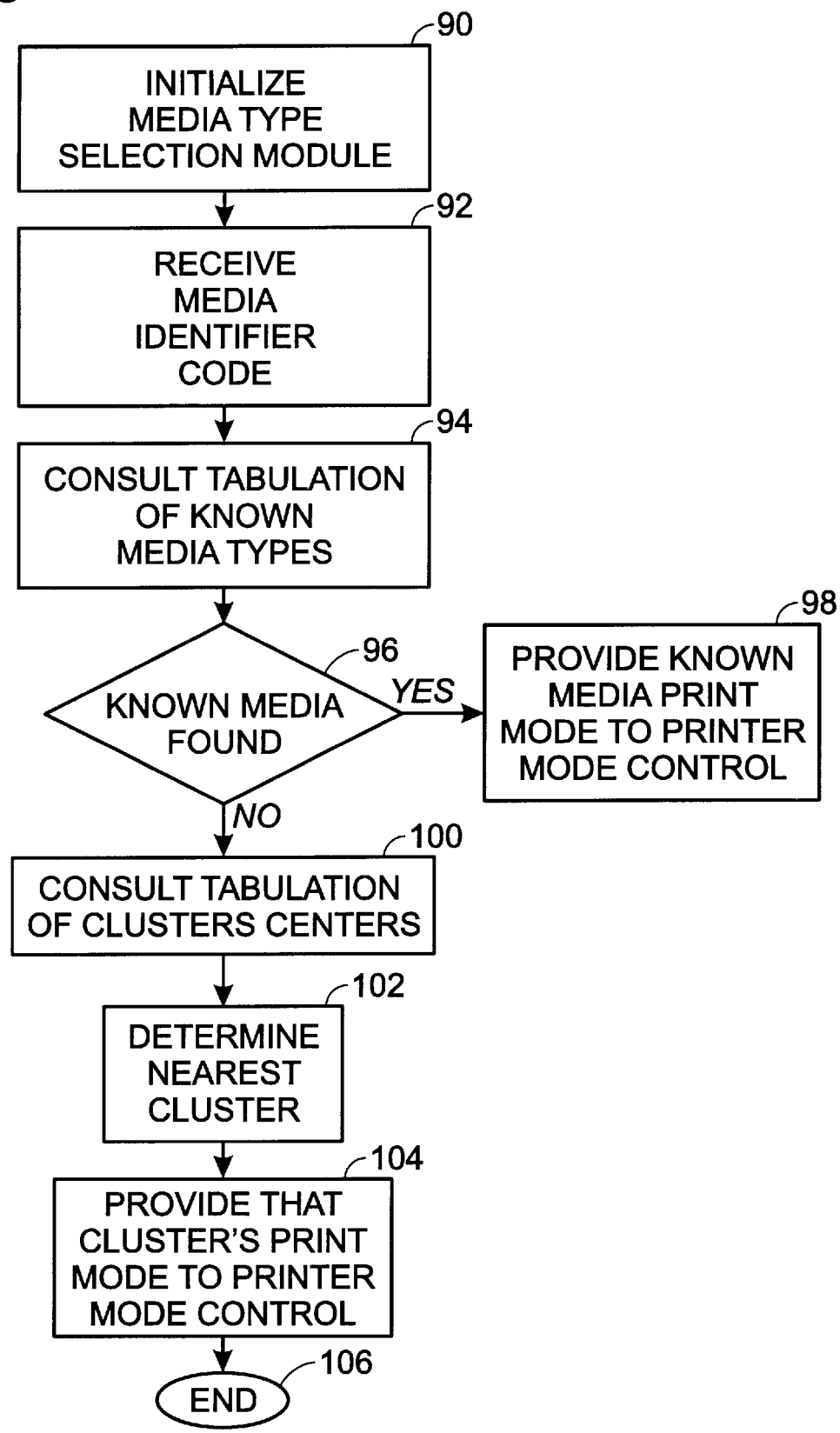
FIG. 4 is a flow diagram illustrating the steps carried out by the printer's processor in selecting a print mode based upon the identifier code carried by the media undergoing printing.

The operation of the present invention, as primarily embodied in the just described media type selection module 44, is summarized with respect to the flow diagram of FIG. 4.

The module is initialized 90 and thereafter receives 92 from the code reader 42 the twelve-bit identifier code.

Next consulted 94 is the small look-up table 50 of certain media types that have particular, associated print modes. If one of the stored codes in the table matches the identifier code 96, the print mode corresponding to that known media type is provided 98 to the print mode control 34 to control the printer's cartridges accordingly.

In the event that the identifier code does not match a code stored in table 50, the module 44 uses a distance algorithm to compare the addresses of each center-cell 100 with that of the "unknown" identifier code to determine which center cell is nearest to the identifier code 102. The print mode associated with that nearest center cell is provided 104 to the print mode control 34, and the module's task is complete 106.

It is pointed out that although a look-up table was described above as the preferred data structure, it is contemplated that the principles of the present invention can be employed with any of a variety of structures.

Also, the table 60 may be characterized as a two dimensional matrix. One dimension of the matrix being defined by the range of data corresponding to the first six bits of identifier code and the other being identified by the last six bits of identifier code. The clusters, therefore, reside in areas defined by parts of the first- and second-dimension data. Discrete locations in the matrix can also be designated as cells.

Although preferred and alternative embodiments of the present invention have been described, it will be appreciated by one of ordinary skill in this art that the spirit and scope of the invention is not limited to those embodiments, but extend to the various modifications and equivalents as defined in the appended claims.

What is claimed is:

1. A method for selecting one of at least two print modes for operating a printer to print on media that carries an identifier code, the method comprising the steps of:
   providing a two-dimensional matrix having a first dimension defined by a range of first-dimension data and a second dimension defined by a range of second-dimension data;
   defining a first cluster of selected parts of the first-dimension data and the second-dimension data;
   correlating a first print mode to the first cluster;
   defining a second cluster of selected parts of the first-dimension data and the second-dimension data;
   correlating a second print mode to the second cluster; and
   selecting the first print mode or the second print mode, depending upon correspondence between the identifier code and the dimension data of the first cluster and the second cluster.

2. The method of claim 1 wherein the first and second clusters include cells, each cell having a discrete address defined by units of the first-dimension data and the second-dimension data, and wherein the selecting step includes matching the identifier code with the address of a cell.

3. The method of claim 1 further comprising the step of establishing a center of the first cluster and a center of the second cluster, and wherein the selecting step includes determining the nearness of the identifier code with the centers of the first and second clusters.

4. The method of claim 1 including the step of storing in memory a look-up table comprising a subset of the matrix, wherein the look-up table includes a number of cells, each cell having a discrete code and print mode associated therewith, and wherein the selecting step includes comparing the identifier code with the code of the cells in the table thereby to establish the correspondence between the identifier code with a particular print mode in instances where there is a match between the identifier code and a cell code; and further comprising the step of establishing a center of the first cluster and a center of the second cluster, wherein the selecting step includes determining the nearness of the identifier code to the centers of the first and second clusters thereby to establish the correspondence between the identifier code and one of the first and second clusters in instances where there is no match between the identifier code and a cell address.

5. A method of facilitating selection of one of at least two print modes for operating a printer to print on media that carries an identifier code that is a number of binary bits in length, the identifier code corresponding to any of a plurality of media types, the method comprising the steps of:
   providing a matrix having a first dimension defined by a range of first-dimension data and a second dimension defined by a range of second-dimension data;
   defining a first cluster that corresponds to selected parts of the matrix;
   associating a first print mode with the first cluster;
   defining a second cluster that corresponds to selected parts of the matrix;
   associating a second print mode with the second cluster; and
   locating at least one cell in each of the first and second clusters, each cell having a discrete address defined by a unit of the first-dimension data and a unit of the second-dimension data, the address corresponding to the identifier code of one of the plurality of media types.

6. The method of claim 5 wherein the providing step includes:
   incrementing the first-dimension data range in units defined by a number of binary bits;
   incrementing the second-dimension data range in units defined by a number of binary bits;
   wherein a concatenation of first-dimension data units and second-dimension data units results in a cell address having a number of binary bits matching the number of binary bits of the identifier code.

7. The method of claim 6 wherein both incrementing steps include selecting the number of binary bits to be six, whereby the concatenation yields a twelve-bit address.

8. The method of claim 6 wherein both incrementing steps include the steps of selecting the binary bits to be in cyclic binary code.

9. The method of claim 5 including the step of selecting a cell in the matrix that is central to the first cluster and another cell that is central to the second cluster thereby to provide means for determining nearness of identifier code to the center of the first cluster and to the center of the second cluster.

10. The method of claim 5 including the step of storing in memory the located cells in each of the first and second clusters, thereby to define a look-up table.

11. A system for facilitating a selection of one of at least two print modes for operating a printer to print on a sheet of media that carries one of a plurality of identifier codes; the system comprising:
   a code reader for reading the identifier code carried by the sheet;
   a processor for receiving the identifier code read by the code reader;
   a memory associated with the processor and including a tabulation of media types, the tabulation including cells, each cell having a code that has associated with it a print mode; and nearness means for determining a print mode in the event the identifier code carried by the sheet does not match one of the codes included in the tabulation, the nearness means including a matrix of known media types arranged to have row addresses and column addresses in a predictable order.

12. The system of claim 11 including look-up means for determining whether the identifier code carried by the sheet matches one of the codes included in the tabulation.

13. The system of claim 11 wherein the row addresses and column addresses are designated in cyclic binary code.

14. The system of claim 11 wherein each of the row addresses is identifiable by six or fewer bits and wherein each of the column addresses is identifiable by six or fewer bits.

15. The system of claim 14 wherein each of the row addresses comprises six or fewer cyclic binary bits and wherein each of the column addresses comprises six or fewer cyclic binary bits.

16. The system of claim 11 including encoding means for encoding on print media identifier code for identifying the type of the media.

17. The system of claim 16 wherein the encoding means is for limiting the identifier code to no more than twelve bits.

18. The system of claim 16 wherein the encoding means is a bar code.

* * * * *